(12) United States Patent
Parekh et al.

(10) Patent No.: US 11,888,927 B2
(45) Date of Patent: Jan. 30, 2024

(54) SYSTEM AND METHOD FOR FAST APPLICATION AUTO-SCALING

(71) Applicant: Capital One Services, LLC, McLean, VA (US)

(72) Inventors: Nirmal Parekh, Glen Allen, VA (US); Zachary Abrahamson, Moseley, VA (US); Mahesh Veerabathiran, Henrico, VA (US); Sathish Gampa, Plano, TX (US); Steven Pearson, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/564,936

(22) Filed: Dec. 29, 2021

(65) Prior Publication Data

US 2022/0124145 A1  Apr. 21, 2022

Related U.S. Application Data

(63) Continuation of application No. 16/430,888, filed on Jun. 4, 2019, now Pat. No. 11,228,643.

(51) Int. Cl.
| | |
|---|---|
| *H04L 67/1001* | (2022.01) |
| *G06F 9/445* | (2018.01) |
| *G06F 9/455* | (2018.01) |
| *H04L 43/08* | (2022.01) |
| *H04L 47/70* | (2022.01) |

(52) U.S. Cl.
CPC ...... *H04L 67/1001* (2022.05); *G06F 9/44505* (2013.01); *G06F 9/45558* (2013.01); *H04L 43/08* (2013.01); *H04L 47/827* (2013.01); *G06F 2009/45562* (2013.01); *G06F 2009/45595* (2013.01)

(58) Field of Classification Search
CPC .............. H04L 67/1001; H04L 47/827; G06F 9/44505; G06F 9/45558; G06F 2009/45562; G06F 2009/45595
See application file for complete search history.

(56) References Cited

U.S. PATENT DOCUMENTS

| | | | | |
|---|---|---|---|---|
| 8,260,893 B1 * | 9/2012 | Bandhole | ............. | G06F 9/5083 |
| | | | | 709/224 |
| 8,572,612 B2 * | 10/2013 | Kern | .................. | G06F 9/45558 |
| | | | | 718/1 |
| 8,856,339 B2 * | 10/2014 | Mestery | ............... | H04L 49/356 |
| | | | | 709/227 |
| 8,997,107 B2 * | 3/2015 | Jain | ...................... | G06F 9/4881 |
| | | | | 709/224 |

(Continued)

*Primary Examiner* — Jimmy H Tran
(74) *Attorney, Agent, or Firm* — KDW Firm PLLC

(57) ABSTRACT

A resource management system is disclosed herein that quickly and dynamically tailors application resource provisioning to real-time application resource consumption. The resource management system may service application requests using resources selected from a pool of servers, the pool of servers including a mixture of virtual server resources and serverless instance resources. The serverless instance resource may comprise software objects programmed using a machine image reflecting one or more states of a virtual application server booted using application-specific program code. Supporting an application using serverless instances enables dynamic scaling of application resources to support real-time application servicing loads.

20 Claims, 6 Drawing Sheets

(56) References Cited

U.S. PATENT DOCUMENTS

| | | | | |
|---|---|---|---|---|
| 9,069,606 B2* | 6/2015 | Donahue | G06F 9/5083 |
| 9,110,600 B1 | 8/2015 | Brooker | G06F 11/1458 |
| 9,116,715 B2* | 8/2015 | von Eicken | G06F 8/63 |
| 9,405,593 B2* | 8/2016 | McGrath | G06F 9/5072 |
| 9,448,824 B1* | 9/2016 | Fitzgerald | G06F 9/5083 |
| 9,461,969 B2* | 10/2016 | Watt | H04L 63/0272 |
| 9,578,063 B1* | 2/2017 | Iyer | G06F 9/45558 |
| 9,594,598 B1* | 3/2017 | Brouwer | G06F 9/4856 |
| 9,705,785 B2* | 7/2017 | Gember-Jacobson | G06F 9/45533 |
| 9,722,945 B2* | 8/2017 | Siciliano | H04L 47/70 |
| 9,740,583 B1* | 8/2017 | Brandwine | G06F 21/6218 |
| 9,927,980 B1* | 3/2018 | LeCrone | G06F 11/1456 |
| 10,033,832 B2* | 7/2018 | Werth | H04L 67/125 |
| 10,095,545 B1* | 10/2018 | Gupta | G06F 9/45558 |
| 10,120,714 B1* | 11/2018 | Cabrera | G06F 9/5011 |
| 10,341,355 B1* | 7/2019 | Niemoller | H04L 67/10 |
| 10,346,618 B1* | 7/2019 | Ah Kun | H04L 9/0861 |
| 10,506,026 B1* | 12/2019 | Brown | H04L 67/34 |
| 10,637,738 B1* | 4/2020 | McDowell | H04L 41/12 |
| 10,649,861 B1* | 5/2020 | Natanzon | H04L 12/66 |
| 10,761,893 B1* | 9/2020 | Bhadauria | G06F 9/5044 |
| 10,860,380 B1* | 12/2020 | Kowalski | G06F 13/10 |
| 10,891,140 B1* | 1/2021 | Levin | G06F 9/45533 |
| 10,999,234 B1* | 5/2021 | Shveykin | H04L 67/55 |
| 11,080,041 B1* | 8/2021 | Ah Kun | G06F 9/44505 |
| 11,385,919 B1* | 7/2022 | Gafton | G06F 8/658 |
| 2007/0074208 A1* | 3/2007 | Ling | G06F 9/45558 718/1 |
| 2009/0113423 A1* | 4/2009 | Hiltgen | G06F 9/45558 718/1 |
| 2009/0199116 A1* | 8/2009 | von Eicken | G06F 8/63 718/1 |
| 2009/0271472 A1* | 10/2009 | Scheifler | G06F 9/5072 709/202 |
| 2010/0005175 A1* | 1/2010 | Swildens | G06F 9/5061 709/226 |
| 2010/0125855 A1* | 5/2010 | Ferwerda | G06F 21/53 713/169 |
| 2010/0220622 A1* | 9/2010 | Wei | H04L 41/0896 370/468 |
| 2011/0093847 A1* | 4/2011 | Shah | G06F 9/45558 718/1 |
| 2011/0258621 A1* | 10/2011 | Kern | G06F 9/45558 718/1 |
| 2012/0233315 A1* | 9/2012 | Hoffman | G06F 9/5072 709/224 |
| 2013/0007753 A1* | 1/2013 | Jain | G06F 9/46 718/103 |
| 2013/0014107 A1* | 1/2013 | Kirchhofer | G06F 9/5083 718/1 |
| 2013/0174149 A1* | 7/2013 | Dasgupta | G06F 9/5077 718/1 |
| 2013/0227699 A1* | 8/2013 | Barak | H04L 63/0823 718/1 |
| 2013/0239109 A1* | 9/2013 | Ferwerda | G06F 9/5027 718/1 |
| 2013/0268799 A1* | 10/2013 | Mestery | H04L 49/356 714/4.2 |
| 2013/0297802 A1* | 11/2013 | Laribi | H04L 12/6418 709/226 |
| 2014/0040343 A1* | 2/2014 | Nickolov | H04L 69/32 709/201 |
| 2014/0040885 A1* | 2/2014 | Donahue | G06F 9/45558 718/1 |
| 2014/0052864 A1* | 2/2014 | Van Der Linden | H04L 47/70 709/226 |
| 2014/0173591 A1* | 6/2014 | Lin | G06F 9/45533 718/1 |
| 2014/0201572 A1* | 7/2014 | Dancy | H04L 41/0893 714/37 |
| 2014/0201642 A1* | 7/2014 | Vicat-Blanc | H04L 63/08 715/736 |
| 2014/0280433 A1* | 9/2014 | Messerli | H04L 67/10 709/201 |
| 2014/0304404 A1* | 10/2014 | Marr | G06F 9/5005 709/224 |
| 2014/0330948 A1* | 11/2014 | Dunn | H04L 41/0813 709/221 |
| 2014/0365626 A1* | 12/2014 | Radhakrishnan | G06F 9/45558 709/222 |
| 2015/0058467 A1* | 2/2015 | Douglas | H04L 67/51 709/223 |
| 2015/0106520 A1* | 4/2015 | Breitgand | H04L 67/101 709/226 |
| 2015/0113120 A1* | 4/2015 | Jacobson | H04L 47/70 709/224 |
| 2015/0154057 A1* | 6/2015 | McGrath | G06F 9/5077 718/1 |
| 2015/0169329 A1* | 6/2015 | Barrat | G06F 9/5077 713/2 |
| 2015/0222705 A1* | 8/2015 | Stephens | G06F 3/067 709/214 |
| 2015/0261559 A1* | 9/2015 | Sliwa | G06F 9/5077 718/1 |
| 2015/0281113 A1* | 10/2015 | Siciliano | G06F 9/5072 709/226 |
| 2015/0331708 A1* | 11/2015 | Bala | G06F 11/1402 718/1 |
| 2015/0363278 A1* | 12/2015 | Harris | G06F 11/2028 714/15 |
| 2016/0092202 A1* | 3/2016 | Filali-Adib | G06F 9/5077 717/168 |
| 2016/0110215 A1* | 4/2016 | Bonilla | G06F 9/45558 718/1 |
| 2016/0139885 A1* | 5/2016 | Dube | G06F 8/77 717/101 |
| 2016/0182360 A1* | 6/2016 | Gember-Jacobson | G06F 9/45533 370/412 |
| 2017/0034012 A1* | 2/2017 | Douglas | H04L 41/0806 |
| 2017/0060558 A1* | 3/2017 | Koushik | G06F 8/61 |
| 2017/0147243 A1* | 5/2017 | Kowalski | G06F 3/0619 |
| 2017/0228248 A1* | 8/2017 | Bala | G06F 9/45558 |
| 2018/0095997 A1* | 4/2018 | Beveridge | G06F 9/455 |
| 2018/0101425 A1* | 4/2018 | McChord | G06F 11/3055 |
| 2018/0109421 A1* | 4/2018 | Laribi | H04L 43/0817 |
| 2018/0196827 A1* | 7/2018 | Sundaram | G06F 3/067 |
| 2018/0260125 A1* | 9/2018 | Botes | G06F 11/1662 |
| 2018/0260251 A1* | 9/2018 | Beveridge | H04L 67/567 |
| 2018/0359192 A1* | 12/2018 | Salle | G06F 9/5022 |
| 2018/0359311 A1* | 12/2018 | Paramasivam | H04L 67/025 |
| 2018/0373879 A1* | 12/2018 | Lango | H04L 63/0428 |
| 2019/0018715 A1* | 1/2019 | Behrendt | G06F 8/71 |
| 2019/0050235 A1* | 2/2019 | Buswell | G06F 9/4406 |
| 2019/0146780 A1* | 5/2019 | Barrat | H04L 67/34 718/102 |
| 2019/0149480 A1* | 5/2019 | Singhvi | H04L 47/2483 709/226 |
| 2019/0155699 A1* | 5/2019 | Luo | G06F 11/1469 |
| 2019/0163580 A1* | 5/2019 | Pandey | G06F 11/1464 |
| 2019/0163763 A1* | 5/2019 | Pandey | G06F 11/301 |
| 2019/0213044 A1* | 7/2019 | Cui | G06F 9/5072 |
| 2019/0258953 A1* | 8/2019 | Lang | G06N 3/0454 |
| 2019/0273654 A1* | 9/2019 | Liguori | G06F 9/5072 |
| 2019/0306692 A1* | 10/2019 | Garty | H04L 41/12 |
| 2019/0310875 A1* | 10/2019 | Noll | G06F 8/65 |
| 2019/0332368 A1* | 10/2019 | Allen | G06F 8/63 |
| 2019/0370075 A1* | 12/2019 | Cui | G06F 9/5027 |
| 2020/0034167 A1* | 1/2020 | Parthasarathy | G06F 9/45558 |
| 2020/0110878 A1* | 4/2020 | Hu | G06F 9/45558 |
| 2020/0183755 A1* | 6/2020 | Dao | G06F 9/5038 |
| 2020/0356443 A1* | 11/2020 | Pawar | G06F 11/1458 |
| 2020/0379648 A1* | 12/2020 | Kumarasamy | G06F 16/27 |
| 2020/0389516 A1* | 12/2020 | Parekh | G06F 9/5077 |
| 2021/0056002 A1* | 2/2021 | Ashraf | G06F 11/1451 |
| 2021/0152423 A1* | 5/2021 | Singh | H04L 41/0897 |
| 2021/0209060 A1* | 7/2021 | Kottomtharayil | G06F 11/1464 |

(56) References Cited

U.S. PATENT DOCUMENTS

2021/0240513 A1\*  8/2021  Shevade ............... G06F 9/5027
2021/0357361 A1\*  11/2021  Porath .................... G06F 3/065
2021/0365185 A1\*  11/2021  Shtarkman .......... G06F 11/2094

\* cited by examiner

SYSTEM AND METHOD FOR FAST APPLICATION AUTO-SCALING

CROSS-REFERENCE TO RELATED APPLICATIONS

This application is a continuation of U.S. patent application Ser. No. 16/430,888, entitled "SYSTEM AND METHOD FOR FAST APPLICATION AUTO-SCALING" filed on Jun. 4, 2019. The contents of the aforementioned application are incorporated herein by reference in their entirety.

BACKGROUND

Service providers, such as telecommunications service providers (TSPs), application service providers (ASPs), storage service providers (SSPs), and internet service providers (ISPs) may provide services in the form of application services to clients. One criteria by which a service provider is judged is the speed of delivery of their service. One factor which adversely effects application performance arises when the resources that are allocated to an application service by a service provider become overloaded.

Service providers typically allocate dedicated resources to application services in a manner that ensures that application servicing is not delayed due to resource bottlenecks. However, the demand for application services may vary over time, undergoing periods of high and low resource utilization. In an ideal world a service provider would secure resources sufficient to handle any peak demand, but such a solution is expensive and wasteful.

To overcome these drawbacks, enterprises may scale their resources in accordance with current application service traffic volume, increasing resources as needed and removing resources when peak demand has ebbed. However, typical scaling methods may require a significant amount of time to provision and boot new resources before a new resource can support application traffic.

These delays with bringing resources online may cause delays and errors in application processes. As a result, service providers may over-allocate resources to an application. While increasing application servicing expense, such over allocation may be insufficient to address rogue spikes in application demand.

SUMMARY

According to one aspect, a resource management system includes a plurality of resources and an application server to manage requests to an application supported by a service provider. The resource management system includes a pool of servers comprising a virtual server generated by the application server to support requests to access the application. The virtual server may be mapped to a subset of the plurality of resources of the resource management system and booted to an initialized application state. A storage device is included for storing a custom machine image of the initialized application state of the virtual server. The system includes load balancing logic, configured to distribute requests for the application to the pool of servers and to monitor a metric data of the pool of servers to detect a performance issue. The resource management system includes a serverless instance interface operable in response to detection of the performance issue to forward a serverless instance request including the custom machine image of the initialized application server state. The serverless instance interface may be configured to receive a serverless instance in response to the serverless instance request for addition to the pool of servers, the serverless instance comprising a copy of the custom machine image.

According to a further aspect, a method for managing application performance includes the steps of launching an application including generating a pool of servers configured to support the application, the pool of servers comprising one or more virtual servers mapped to one or more resources of a service provider. The method may include initializing the one or more virtual servers using application-specific program code to provide a custom machine image corresponding to an initialized state of at least one virtual server configured to support the application and storing the custom machine image. The method includes collecting a performance metric related to an execution of the application using the pool of servers, monitoring the performance metric to detect a performance issue for the pool of servers and, in response to detecting the performance issue, generating a serverless instance using the custom machine image. The method further comprises the steps of updating the pool of servers by adding the serverless instance to the pool of servers and forwarding access requests for the application to the pool of servers to balance a distribution of access requests between the one or more virtual servers and the serverless instance.

According to a further aspect, an application management system of a service provider includes a plurality of resources for supporting an application service of the service provider including storage resources, processing resources, program code and data. The system may include a scaling controller for generating a pool of servers to support the application service of the service provider, the scaling controller configured to generate a virtual server specific to the application service by provisioning a subset of resources of the plurality of resources to the application service and executing application specific boot code using the subset of resources to provide the virtual server in an initialized state, the scaling control being configured to the initialized state of the virtual server as a custom machine image. The system includes a memory to store the custom machine image, monitoring logic coupled to each pool of servers to collect performance information related to the application service and scaling logic, coupled to the monitoring logic and configured to selectively scale a size of at least one pool of virtual servers in response to the performance information to add a serverless instance to the pool of servers, the serverless instance comprising a copy of the custom machine image. The system may include load balancing logic configured to balance application access requests among the virtual server and the serverless instance.

With such an arrangement, applications service support may be quickly scaled up or down in accordance with network traffic load, incurring minimal delay during the generation and deployment of the serverless instance. Because the serverless instances use shared resources whose cost is generally determined according to actual use, service providers may more closely tailor the cost of application service support to application load. As a result, the need to purchase and maintain shadow resources to handle rogue spikes in application requests to maximize performance may be reduced and/or eliminated. The systems and methods disclosed herein may be practically applied by service providers to provide increased application performance at reduced cost.

DEFINITIONS

Figure 1:
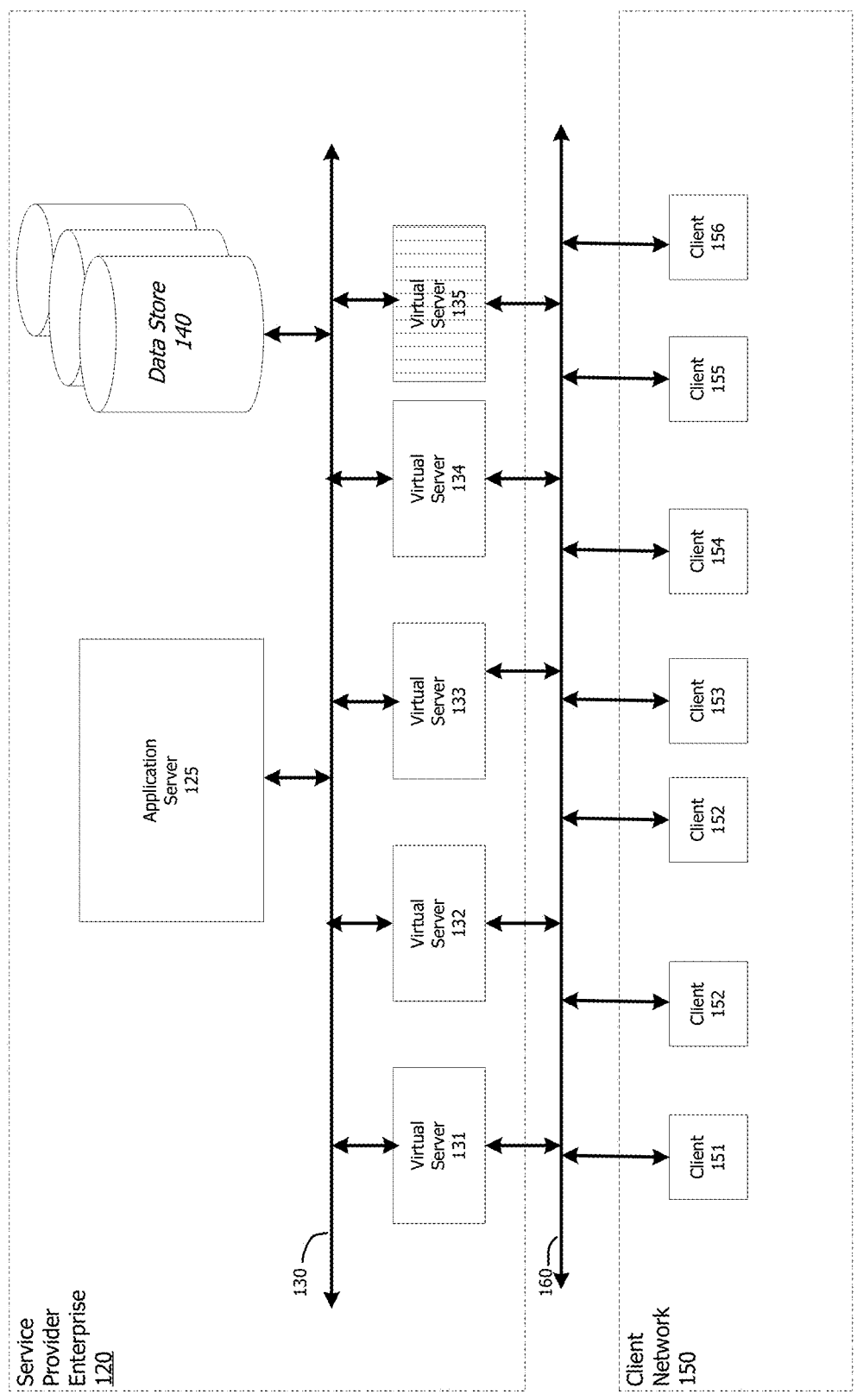
FIG. 1 is a block diagram of an exemplary embodiment of a prior art service provider network.

As used herein, unless specifically indicated otherwise, the word "or" is used in the inclusive sense of "and/or" and not the exclusive sense of "either/or."

Any issued U.S. patents, allowed applications, published foreign applications, and references that are cited herein are hereby incorporated by reference to the same extent as if each was specifically and individually indicated to be incorporated by reference.

In order for the present invention to be more readily understood, certain terms are first defined below. Additional definitions are set forth throughout the specification.

Application Service means a computer-based service managed by an application hosted by a service provider and accessible to clients and/or customers via the network.

Application Machine Image (AMI) means static program code and data supporting an application, including but not limited to an operating system, application program code, application configuration and data files, such as application libraries, initialized application parameters). AMIs may be used to launch instances for supporting the respective application(s).

Instance means a software object instantiated using a copy of a machine image associated with an application and configured to perform the functions of the application.

Virtual server/Virtual Machine means a server/machine comprised of a combination of hardware and/or software resources of the service provider that together mimic a dedicated machine/server. For example, a virtual server may include program code, comprise data, and be physically mapped to hardware resources dedicated to support application requests.

System/Component/Unit the terms "system," "component" and "unit" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server/virtual server/serverless instance and the server/virtual server/serverless instance can be a component. One or more components can reside within a process and/or thread of execution, and a component can be localized on one computer and/or distributed between two or more computers. Components may be communicatively coupled to each other by various types of communications media to coordinate operations.

DETAILED DESCRIPTION

A resource management system disclosed herein overcomes performance and cost issues associated with prior art application scaling methods using a resource management system that quickly and dynamically tailors application resource support to real-time application resource consumption. One practical application of such resource management system would include management of application resources by a service provider hosting application services. According to one aspect, the resource management system may service application requests using resources selected from a pool of application servers, the pool of application servers including both virtual server resources and serverless instance resources. In one aspect, serverless instance resources comprise software objects programmed using an application-specific machine image representing an initialized state of a virtual application server that has been provisioned and booted using application-specific program code. In some embodiments the serverless instances may be quickly scaled up and down in accordance with application loading to accommodate rogue spikes in network traffic. In some embodiments the serverless instances may be supported in part using third-party resources, such as licensed resources and cloud-based resources, enabling costs to be more closely aligned with actual application resource utilization.

The systems disclosed herein provide both performance and cost benefits over prior art solutions. For example, FIG. 1 illustrates a network 100 including a prior art service provider enterprise 120 coupled to a client network 150 via network 160. The service provider enterprise 120 is shown to include an application server 125, a data store 140 and an enterprise network 130. A plurality of virtual servers 131-135 may be deployed by application server 125 to service application service requests. Each virtual server may comprise a combination of hardware and software resources for supporting the application service. For example, a virtual server may include program code and/or data and hardware resources dedicated for use with the program code and/or data and identified and initialized as part of a boot process. Virtual servers may be associated with different operating systems and/or different software applications.

Client network 150 is shown to include a plurality of client device 151-156, where a client device for the purposes of this example is any device capable of requesting access to an application service managed by application server 125. According to one aspect, as the volume of application service requests received from the client network increases, the application server 125 deploys additional agents to service the requests.

One problem with autoscaling virtual servers involves the amount of time used to complete the boot process before the virtual server is available to service application requests; depending upon the application service, it may take over an hour for a fully operable virtual server to be added to the server pool. In situations resulting in a spike in application service request activity over network 160, servicing may be delayed, for example as virtual server 135 is booted and made available.

Figure 2:
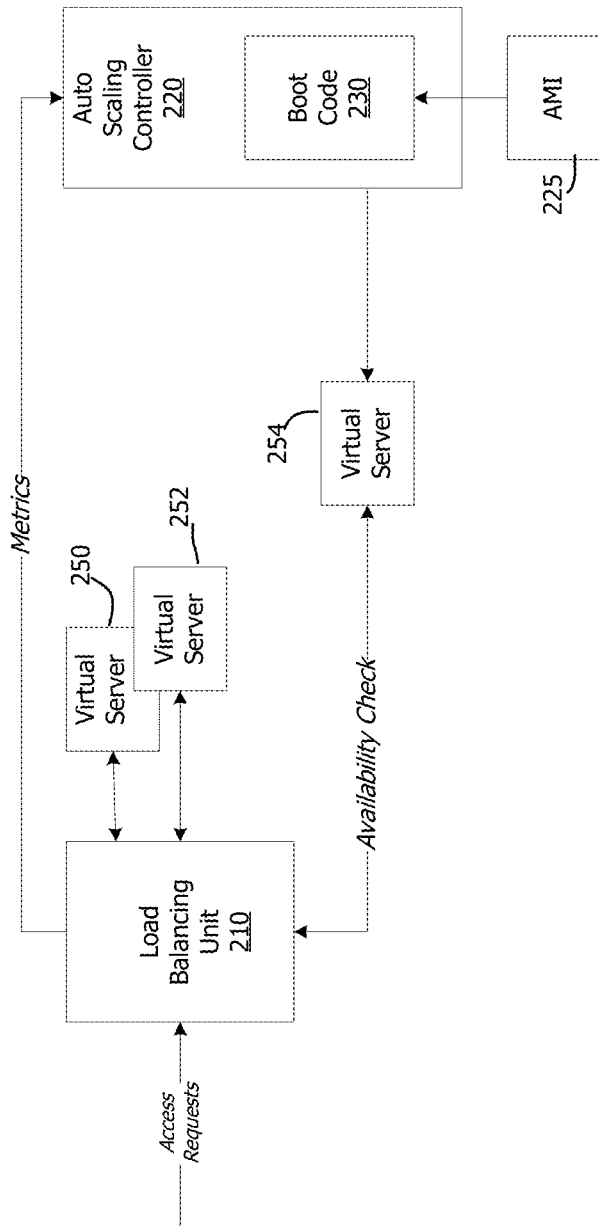
FIG. 2 is a dataflow diagram illustrating a prior art scaling communication flow.

FIG. 2 is a block diagram of one embodiment of a typical prior art autoscaling unit 200, including a load balancing unit 210 coupled to an autoscaling controller 220. In one embodiment, the load balancing unit 210 may be coupled to forward access requests, received from client network 150, to one or more virtual servers 250, 252. The load balancing unit 210 may be configured to forward performance metrics, such as server utilization, speed, bandwidth, response times, delays, etc., to the auto scaling controller 220. The auto scaling controller may monitor the performance metrics to determine when additional resources would be beneficial, and in response to such determination, the auto scaling controller may build and deploy an additional virtual server. For example, the autoscaling controller may use real-time processor and memory utilization, response lag time, etc. and/or may use predictive models based on past performance to determine the number of instances to be deployed at any point in time.

During the boot process, available resources (memory, disk drives, processors, etc.) are dedicated for use by the virtual server 254. This process may also be referred to as 'provisioning'. An application machine image 225, for example identifying data structures and other attributes of the application may be accessed by the auto scaling controller 220. Boot code 230 comprising, for example, operating systems and application service initialization program code may be executed by the auto scaling controller 220 to initialize the state of the virtual server 254, for example by downloading software, libraries and data for use in supporting the associated application service. During provisioning and initialization of the virtual server 254, the load balancing unit 210 may monitor the status of the virtual server 254 to identify when the virtual server is available for use. Once provisioning and initialization is complete, the virtual server 254 is available to load balancing unit 210 for servicing of application requests.

The process of booting a virtual server may be time consuming, in some systems taking more than an hour to complete. Because of the delays associated with booting the virtual server, many service providers may boot and maintain reserve virtual servers that may quickly offload traffic to handle spikes in service requests. This solution undesirably increases the cost of application support and is only as effective as the size of the reserve; tradeoffs are often made between cost and performance in prior art auto-scaling solutions.

Figure 3:
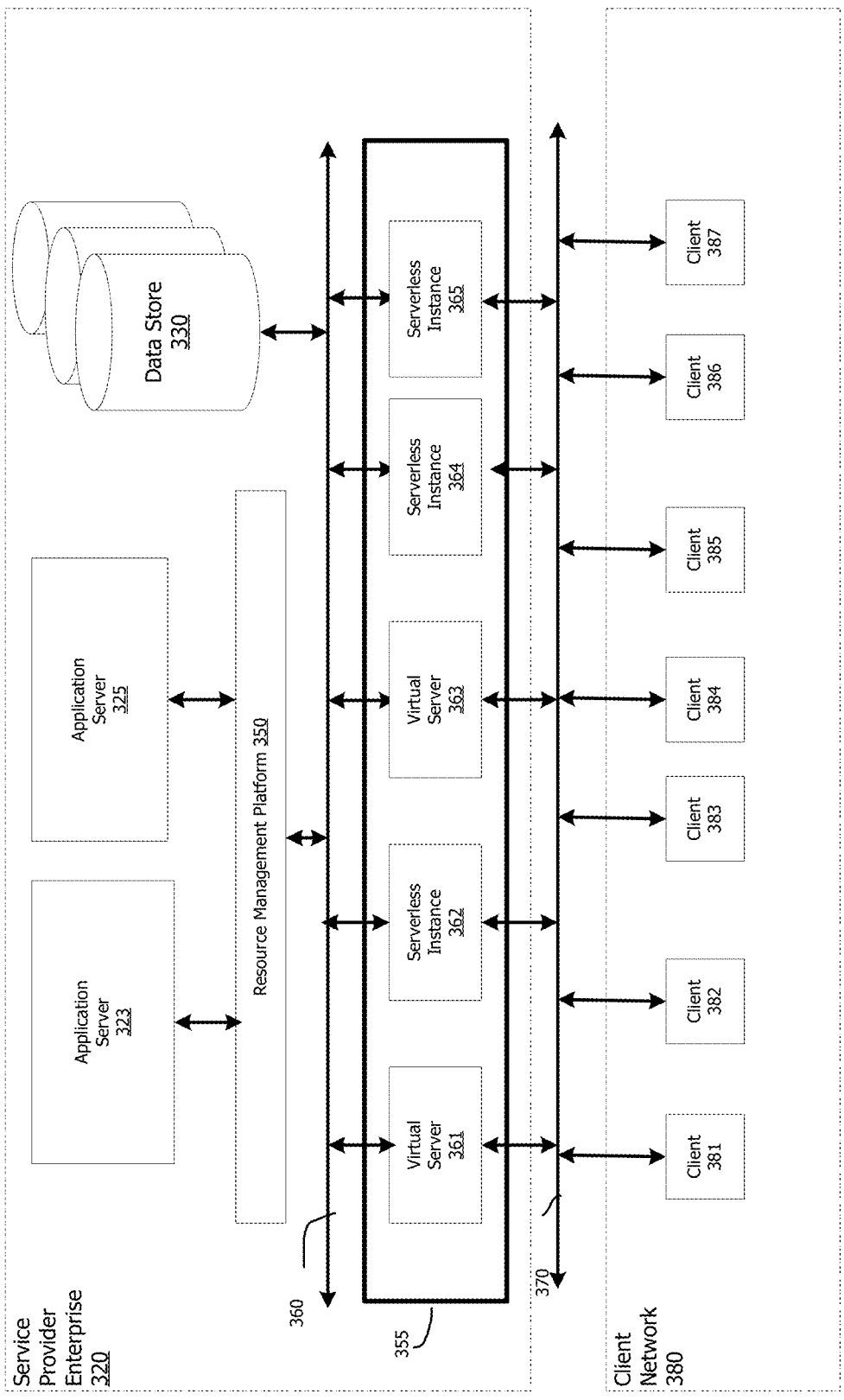
FIG. 3 is a block diagram of an exemplary service provider network including a resource management platform for use in scaling application services support using systems and method disclosed herein.

The resource management platform disclosed herein provides a low-cost autoscaling solution that is capable of quickly responding to fluctuations in application service traffic. Referring now to FIG. 3, a block diagram of a system 300 including a service provider enterprise 320 having a resource management platform 350 configured to overcome the problems of prior art application scaling.

Service provider enterprise 320 may, in one embodiment, be associated with a business providing computer-based services to clients over a network 370. Almost all modern service providers use the internet to provide service offerings to potential consumers. The service offerings are generally provided in the form of software applications which operate using dedicated resources of the service provider. The combination of the software and hardware that provides a particular service to a client is referred to herein as a 'server'. The servers may communicate over public networks 370, or private networks such as enterprise network 360. Private networks of a service provider are often referred to as a corporate or enterprise network.

Service provider enterprise 320 is shown to include an application server 323, an application server 325 and a data store 330 each communicatively coupled to exchange information and data over enterprise network 360. Although each server and/or data store are illustrated as discrete devices, it is appreciated that the servers and data may be comprised of multiple devices distributed throughout the enterprise or, in the case of distributed resources such as 'cloud' resources, throughout the network 370.

The data store 330 may comprise data storage resources that may be used, for example, to store customer accounts, customer data, application data other information for use by the application servers 323, 325. The data store 330 may be comprised of coupled data resources comprising any combination of local storage, distributed data center storage or cloud-based storage.

According to one aspect, the service provider enterprise may also include a pool of servers 355. The pool of servers 355 advantageously includes a combination of virtual servers such as virtual server 361 and virtual server 363 and serverless instances 362, 364 and 365. The pool of servers 355 thus includes a plurality of resources for supporting the application, wherein a portion of the servers in the server pool are mapped to underlying resources of the service provider, and another portion of the servers in the server pool are 'serverless' instances; i.e., program code objects that have been configured using a machine image of an initialized, booted, provisioned virtual server. In embodiments, the serverless instances comprise snapshots of machine images of a virtual server taken at a specific instances in time, such as following initialization, including all of the program code, libraries, data stores etc. of a fully initialized virtual server such that the serverless instance object may execute application service requests as though it was the virtual server.

In one aspect, the serverless instance 362 may be generated using an instance generation service that translates the application machine image into an object comprising a sequence of one or more functions that emulate the operation of the initialized application virtual server. The instance generation logic may be a service provided as part of the service provider enterprise or may be a third-party licensed service. An example of a third-party agent building logic service is the Amazon Web Service (AWS) Lambda product provided by Amazon® Corporation. The AWS Lambda service may be invoked to run software code without provisioning servers, allowing the service provider enterprise to pay only for those resources actually consumed by the generated agent. Serverless instances may be quickly deployed and/or removed, providing high availability to application services of the service provider without the cost and delays of prior art resource management systems. With such an arrangement, applications service support may be quickly scaled up or down in accordance with network traffic load, incurring minimal delay during the generation and deployment of the serverless instance. Because the serverless instances use shared resources whose cost is generally determined according to actual use, service providers may more closely tailor the cost of application service support to application load. As a result, the need to purchase and maintain shadow resources to handle rogue spikes in application requests to maximize performance may be reduced and/or eliminated.

The server pool 355 thus includes a collection of resources for handling application service requests received from a plurality of clients 381-387 in client network 380 over network 370.

As referred to herein, a 'client' is any device that is configured to access an application service of the service provider enterprise 320. Client devices may include any network-enabled computer including, but not limited to: e.g., a mobile device, a phone, a 'smart' watch, a handheld PC, a personal digital assistant (PDA), an iPhone, iPod, iPad from Apple® or any other mobile device running Apple's iOS operating system, any device running Microsoft's Windows® Mobile operating system, and/or any other smartphone or like wearable mobile device, such as an Apple® watch or a Garmin® device.

Clients 381-387 may include a plurality of thin client applications specifically adapted for communication with the various applications of the service provider. The thin client applications may be stored in a memory of the client device and be operable when executed upon by the client device to control an interface between the client device and the respective service provider application, permitting a user at the client device to access service provider content and services.

In some examples, network 360 and network 370 may be one or more of a wireless network, a wired network or any combination of wireless network and wired network and may be configured to connect client devices 381-387 to applications of the service provider enterprise 320. As mentioned above, network 360 may comprise an enterprise network; i.e., a network specifically for use in exchanging communications between components of the service provider enterprise 320. Enterprise networks may include additional security to protect enterprise communications, and may include resources specifically dedicated to the enterprise, thereby providing performance advantages to enterprise communications.

Networks 360 and/or 370 may include one or more of a fiber optics network, a passive optical network, a cable network, an Internet network, a satellite network, a wireless local area network (LAN), a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, Near Field Communication (NFC), Radio Frequency Identification (RFID), Wi-Fi, and/or the like.

In addition, networks 360, 370 may include, without limitation, telephone lines, fiber optics, IEEE Ethernet 902.3, a wide area network ("WAN"), a wireless personal area network ("WPAN"), a local area network ("LAN"), or a global network such as the Internet. In addition, networks 360, 370 may support an Internet network, a wireless communication network, a cellular network, or the like, or any combination thereof. Networks 360, 370 may further include one network, or any number of the exemplary types of networks mentioned above, operating as a stand-alone network or in cooperation with each other. Networks 360, 370 may utilize one or more protocols of one or more network elements to which they are communicatively coupled. Networks 360, 370 may translate to or from other protocols to one or more protocols of network devices.

Figure 4:
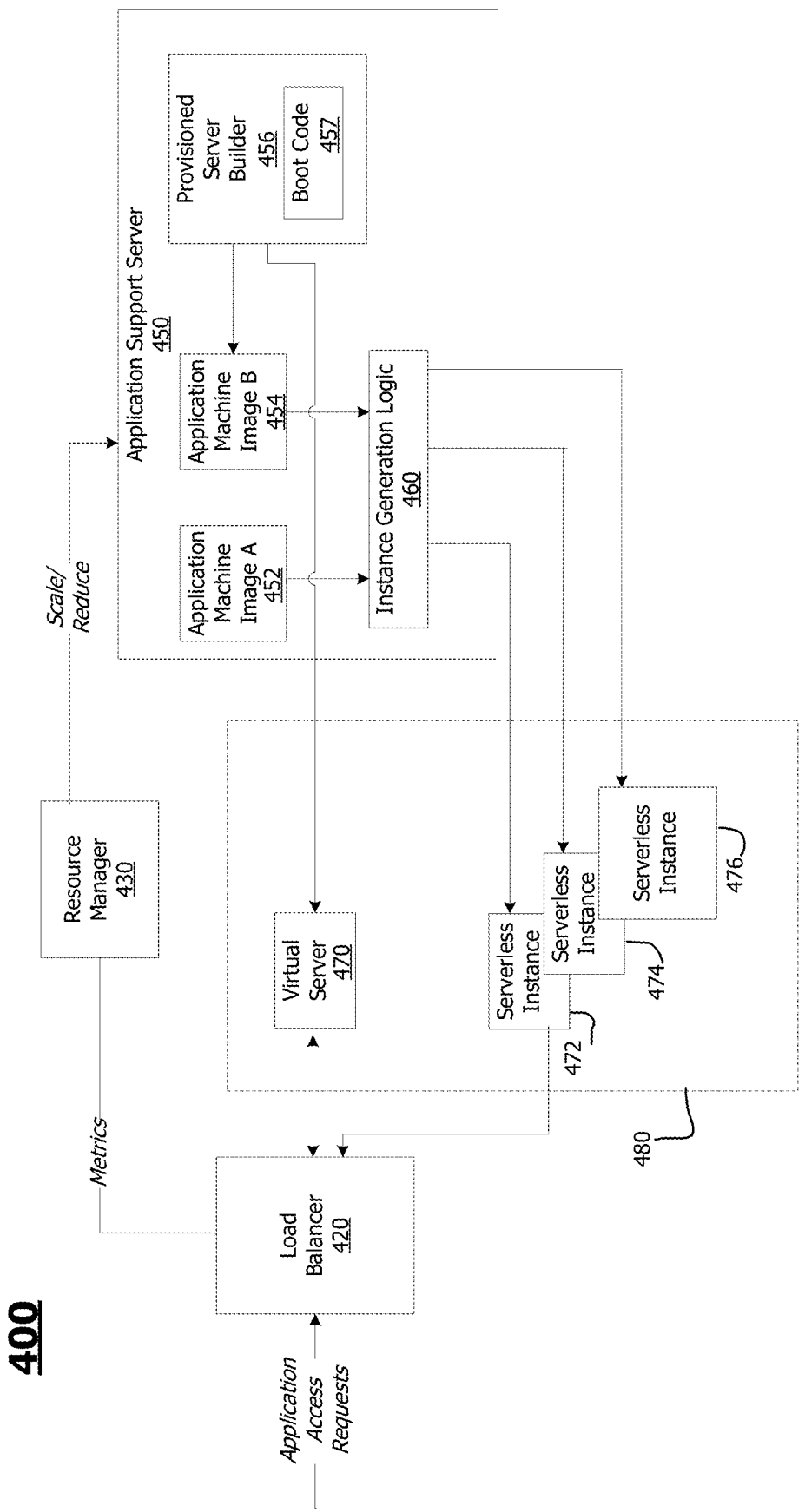
FIG. 4 is a dataflow diagram illustrating an exemplary communication flow for fast scaling of application services support using methods disclosed herein.

FIG. 4 illustrates exemplary components that may be included in a resource management system 400 designed according to the principals disclosed herein. The resource management system 400 may be disposed between the application servers 323, 325 and the client network 380, and in one embodiment generates virtual servers and serverless instances for supporting requests for access to one or more application services provided by the service provider.

In one embodiment, the resource management system 400 may include a load balancer 420 coupled to a pool of servers 480, where the pool of servers may include one or more virtual servers such as virtual server 470 and one or more serverless instances, such as serverless instance 472, 474 and 476. The load balancer 420 is shown to receive application access requests which are selectively forwarded to servers within the pool of servers 480 based on attributes of the servers, including but not limited to server capacity, server load and server 'health', where the health may be measured according to a deviation in performance (i.e., response time for example) from an expected performance.

In one embodiment, the load balancer may collect performance metrics related to the servers within the pool of servers and forward the performance metrics to the resource manager 430. The performance metrics may include, for example, the delay associated with servicing the application requests, duration of application servicing requests, the delays in accessing storage devices used by the application, etc. The resource manager 430 may monitor the performance metrics and determine when additional servers need to be added to the server pool, forwarding communications to an application support server 450 to instruct the application support server 450 to add or remove supporting servers for an application.

In some embodiments, the application support server 450 may comprise functionality for generating two types of application support servers, including both booted and provisioned virtual servers 470 and serverless instances 472 and 476. For example, application support server 450 is shown to include a provisioned server builder 456 and instance generation logic 460.

Similar to the prior art system, the provisioned server builder 456 generates virtual servers by provisioning service provider resources to an application and booting the computer using boot code 457. In some embodiments, the boot code may include, for example, operating system and initialization program code for download onto those resources. Booting the virtual server initializes the resources to a state where the resources are capable of managing application service requests. However, in contrast to prior art systems, the time-consuming task of building virtual servers for scaling purposes to dynamically support application scaling is removed through the generation of serverless instances using custom machine images that represent snapshots of virtual server state at a particular point in time, such as following initialization. With such an arrangement, application support may be rapidly scaled in accordance with application loading.

According to one aspect, once the virtual server resources are provisioned and booted, an application machine image of the virtual server is captured by the application support server and stored for later use. In FIG. 4, application support server 450 is shown to store Application Machine Image (AMI) A 452 and Application Machine Image (AMI) B 454. AMI A 452 and AMI B may be used to store application state for different applications or for the same application. Where AMI A 452 and AMI B 454 store application state for the same application, each machine image may be associated with different versions of the application, for example, versions of the application adapted for particular operating systems, versions of the application associated with different releases or reversions of the application, etc. An application machine image may include, but is not limited to, a template for the root volume to be used for any instantiation of an agent built using the AMI (for example, an operating system, an application server, libraries, data and applications), launch permissions that control which applications may use the image, and a block device mapping that specifies the volumes to attach to any agent when it is launched.

Figure 5:
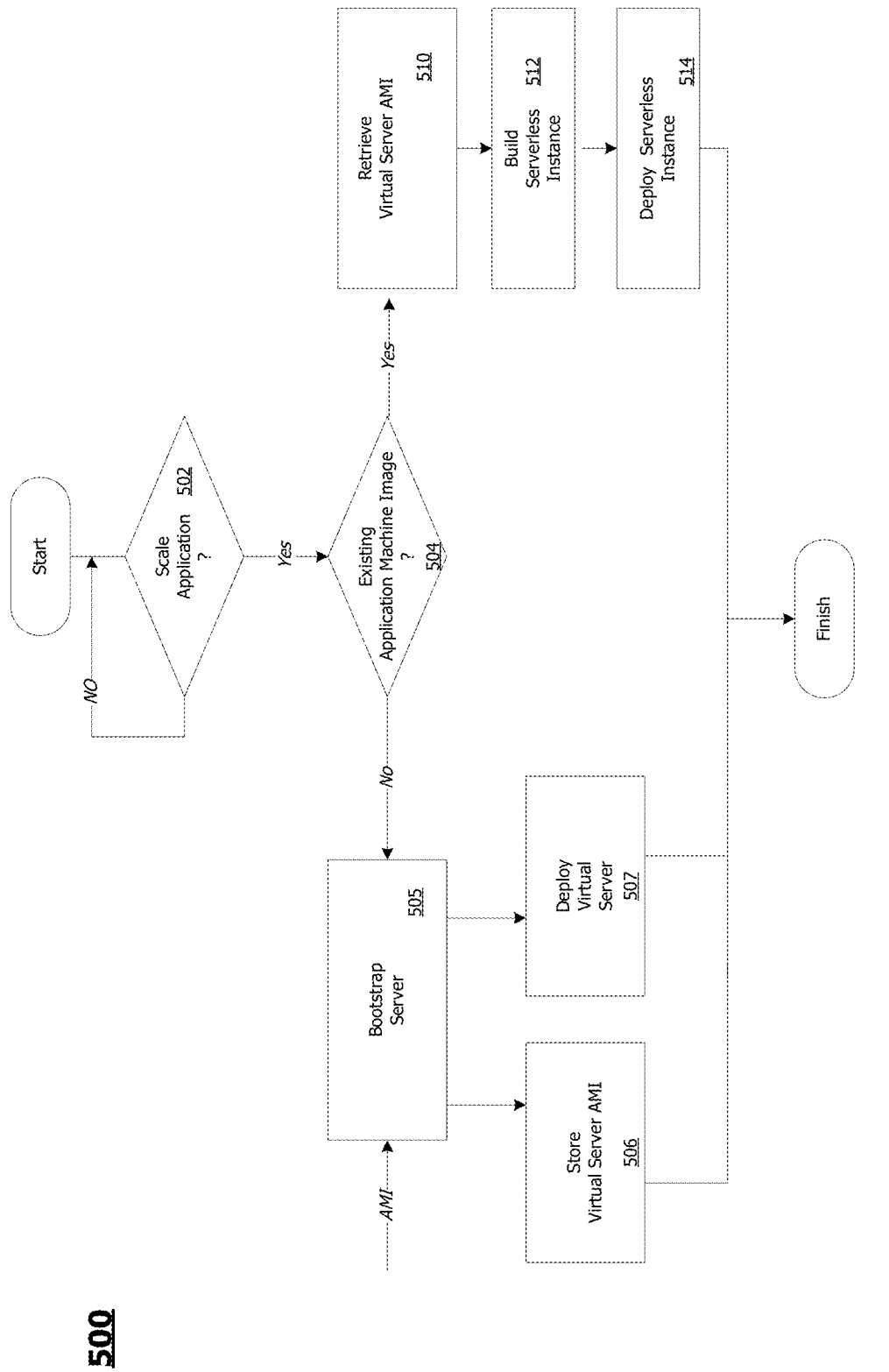
FIG. 5 is a flow diagram of exemplary steps that may be performed by the resource management platform of FIG. 3.

Referring now to FIG. 5, a flow diagram is provided illustrating exemplary steps that may be performed as part of a practical application of a resource management method 500 in a service provider network. At step 502, the application support server awaits receipt of request for additional resources to support the application. Upon receipt of the request, at step 504 it is determined whether a machine image exists for this application; i.e., whether a provisioned, booted virtual server has previously been generated to support the application.

If not, then at step 505 a service provider resources are allocated to a virtual server for the application, and boot code, including operating system program code, application program code, libraries, data and the like are executed on the virtual server to prepare it for support of application service requests. Following provisioning and booting, an application machine image (AMI) of the virtual server is stored at step 506 and at step 507 the virtual server is deployed into the server pool for use by an application server to manage requests to the application service.

If, at step 504 it is determined that a machine image has been previously generated for the application, then at step 510, the virtual server AMI is retrieved from memory, and used at step 512 to build a serverless instance. As mentioned above the serverless instance may, for example, be comprised of initialized program code, libraries, data structures, etc., obtained from the machine image of the virtual server.

At step 514, the serverless instance is deployed to the pool of servers and is thus available for use for servicing application requests. Depending upon the complexity of the application, using the approach of FIG. 5, additional resources may be made available within seconds for use by an application server, thereby permitting the application server to quickly deploy additional resources to handle rogue spikes in network traffic, and to reduce resources as appropriate when there is diminished demand.

Figure 6:
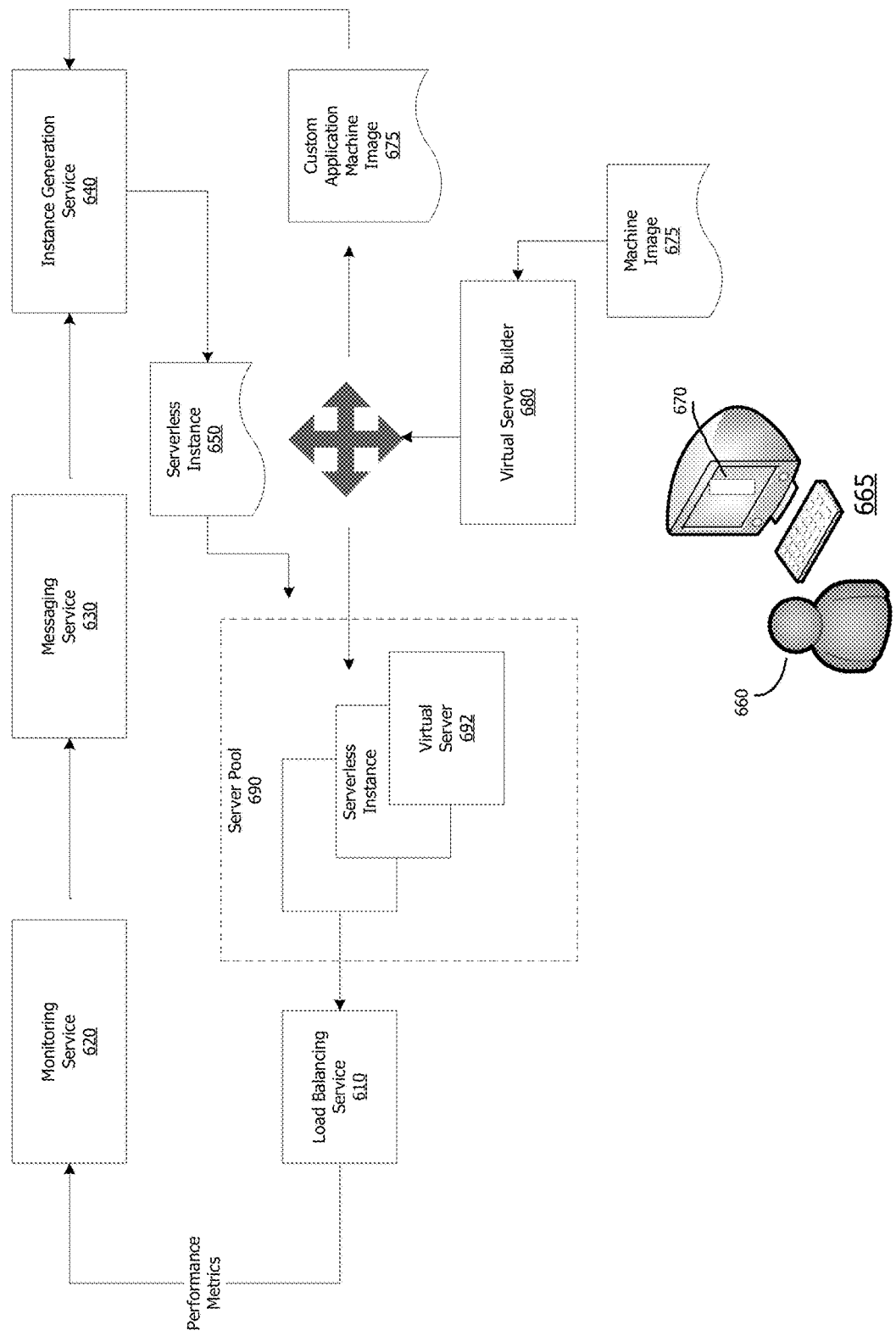
FIG. 6 is a data flow diagram of one exemplary embodiment of a resource management platform disclosed herein.

FIG. 6 is a data flow diagram illustrating exemplary components and data structures of a exemplary practical application of a resource management system 600. In the example of FIG. 6, the components may be selected from a group of service components, for example those provided as part of the Amazon Web Service (AWS®) toolset. It is to be appreciated that similar functionality may be provided through other combinations of hardware and software resources that are owned, shared and/or licensed by the service provider. Thus, although FIG. 6 is provided by way of example, the present invention is not limited to the use of any particular service implementation.

The resource management platform of FIG. 6 includes a virtual server builder 680, a load balancing service 610, a monitoring service 620, a messaging service 630 and an instance generation service 640. The various functions and exemplary implementations are described below, although it is appreciated that other implementations providing similar functionality may be substituted herein by those of skill in the art.

In one embodiment, the Virtual Server Builder 680 may be comprised of an Amazon® Elastic Container Service® (ECS). ECS is a managed service for running containers on AWS, designed to make it easy to run applications in the cloud without worrying about configuring the environment for your code to run in. The ECS builds Elastic Cloud Computing agents (EC2). EC2 agents comprise virtual servers, such as virtual server 692, which may comprise an emulation of a computer system. Virtual servers are based on computer architectures and provide functionality of a physical computer. Their implementations may involve specialized hardware, software, or a combination.

An administrator 660 at a workstation 665 manages application launch using tools provided by a graphic user interface 670 of the resource management system 600. For example, the administrator 660 may select a machine image 675 that may be used as a starting component for building EC2 virtual machines. In one embodiment, machine image 675 may provide the information to launch an agent, including: root volume, launch permissions, and volume-attachment specifications. The generated virtual server 692 is made available in the server pool 690 for use by load balancing service 610. As mentioned previously, a snapshot of the machine state of the initialized virtual server 690 is also captured as custom application machine image 675 and stored in memory for later use by instance generation service 640.

The load balancing service 610 may automatically distribute traffic across multiple resources within the pool of servers, may detect unhealthy servers and rebalance loads in response. The load balancing service 610 may be, for example, an application load balancing service such as the Elastic Load Balancer service (ELB) or the Application Load Balancer (ALB) service provided as part of the Amazon Web Service toolkit.

In one embodiment, the load balancing service may communicate with a monitoring service 620, for example the Amazon CloudWatch® service provided as part of the AWS® toolkit. In exemplary embodiments, the monitoring service may deliver a near real-time stream of system events that describe changes in AWS resources. CloudWatch permits the definition of simple rules which may be used to detect and react to operational changes in application support. For example, the CloudWatch service may be configured to monitor performance metrics received from the load balancing service 610 to identify degradations in performance caused by insufficient or incapable resources, indicating that additional scaling of application resources should be performed.

In one embodiment, upon detection of a scaling opportunity, a messaging service 630 may be used to control an interface with an instance generation service 640. The messaging service in one embodiment may be a high-throughput, push-based, many-to-many messaging system, that is configured to interface with the instance generation service 640. For example, in one embodiment the messaging service 630 may comprise an AWS Simple Notification Service® (SNS), and the instance generation service 640 may comprise an AWS Lambda® service.

AWS Lambda® executes program code as a "Lambda function". That is, the information from the custom application machine image 675 may be used by the instance generation service 640 to generate program code for a serverless instance object 650. Each function includes initialized application program code state as well as some associated configuration information, including the function name and resource requirements. Lambda functions/objects are "stateless," with no affinity to the underlying infrastructure, so that Lambda can rapidly launch as many copies of the function/object/instance as needed to scale to the rate of incoming events.

Once program code is uploaded to AWS Lambda, Lambda may execute the function and manage the compute resources as needed in order to keep up with incoming requests. In one embodiment, the virtual server 692 may be accessed by reference to associated AWS Lambda functions via the load balancing service 610.

Accordingly, a resource management system has been described that quickly and dynamically tailors application resource provisioning to real-time application resource consumption using a combination of virtual servers and serverless instances. By using serverless instances in addition to provisioned servers, the resource management system disclosed herein overcomes performance and cost issues associated with prior art resource management methods.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
generating a plurality of custom machine images of one or more virtual servers, wherein at least one of the plurality of custom machine images is configured with a first initialized application state for an application and the at least one custom machine image configured with the first initialized state for the application includes a template for a root volume for use by an agent built using the at least one custom machine image configured with the first initialized state for the application;
monitoring metric data of a pool of servers to detect a performance issue in providing the application, the pool of servers comprising a plurality of resources for the one or more virtual servers to support requests to access one or more applications;
detecting the performance issue based on the monitoring of the metric data; and
in response to detecting the performance issue:
determining whether a custom machine image has been previously generated for the application,
deploying a serverless instance of the at least one custom machine image configured with the first initialized state for the application to the pool of servers to provide the application responsive to determining that the custom machine image has been previously generated for the application, the serverless instance generated via an instance generation service operative to translate the custom machine image into an object comprising initialized program code of the custom machine image that, when executed, is operative to provide a sequence of one or more functions to emulate an operation of a corresponding virtual server of the custom machine image to provide the application without requiring deployment of the corresponding virtual server, deploying a virtual server for the application responsive to determining that the custom machine image has not been previously generated for the application, and generating the custom machine image for the virtual server following provisioning and booting of the virtual server.

2. The computer-implemented method of claim 1, wherein each of the one or more virtual servers are mapped to a subset of the plurality of resources and booted to an initialized application state.

3. The computer-implemented method of claim 1, wherein each of the custom machine images is generated based on at least a portion of a plurality of resources provisioned and booted with initialization code.

4. The computer-implemented method of claim 3, comprising deploying the serverless instance as an initialized snapshot of a virtual server taken at a specific instance in time following initialization of the virtual server.

5. The computer-implemented method of claim 1, wherein the at least one custom machine image configured with the first initialized state for the application includes a block device mapping that specifies one or more volumes to attach to an agent built using the at least one custom machine image configured with the first initialized state for the application.

6. The computer implemented method of claim 1, wherein at least one of the plurality of custom machine images is configured with a second initialized application state for the application, and the first and second initialized application states are different versions of the application.

7. The computer-implemented method of claim 6, comprising determining to deploy the serverless instance of the at least one custom machine image configured with the first initialized state for the application to the pool of servers to provide the application instead of the at least one of the plurality of custom machine images configured with the second initialized application state for the application based on a state of the application when providing the application.

8. An apparatus, the apparatus comprising:
a processor; and
memory comprising instructions that when executed by the processor cause the processor to:
generate a plurality of custom machine images of one or more virtual servers, wherein at least one of the plurality of custom machine images is configured with a first initialized application state for an application and the at least one custom machine image configured with the first initialized state for the application includes a template for a root volume for use by an agent built using the at least one custom machine image configured with the first initialized state for the application;
monitor metric data of a pool of servers to detect a performance issue in providing the application, the pool of servers comprising a plurality of resources for the one or more virtual servers to support requests to access one or more applications;
detect the performance issue based on the monitoring of the metric data; and
in response to detecting the performance issue:
determining whether a custom machine image has been previously generated for the application,
deploying a serverless instance of the at least one custom machine image configured with the first initialized state for the application to the pool of servers to provide the application responsive to determining that the custom machine image has been previously generated for the application, the serverless instance generated via an instance generation service operative to translate the custom machine image into an object comprising initialized program code of the custom machine image that, when executed, is operative to provide a sequence of one or more functions to emulate an operation of a corresponding virtual server of the custom machine image to provide the application without requiring deployment of the corresponding virtual server,
deploying a virtual server for the application responsive to determining that the custom machine image has not been previously generated for the application, and
generating the custom machine image for the virtual server following provisioning and booting of the virtual server.

9. The apparatus of claim 8, wherein each of the one or more virtual servers are mapped to a subset of the plurality of resources and booted to an initialized application state.

10. The apparatus of claim 8, wherein each of the custom machine images is generated based on at least a portion of a plurality of resources provisioned and booted with initialization code.

11. The apparatus of claim 10, wherein the instructions, when executed by the processor, further cause the processor to deploy the serverless instance as an initialized snapshot of a virtual server taken at a specific instance in time following initialization of the virtual server.

12. The apparatus of claim 8, wherein the at least one custom machine image configured with the first initialized state for the application includes a block device mapping that specifies one or more volumes to attach to an agent built using the at least one custom machine image configured with the first initialized state for the application.

13. The apparatus of claim 8, wherein at least one of the plurality of custom machine images is configured with a second initialized application state for the application, and the first and second initialized application states are different versions of the application.

14. The apparatus of claim 13, wherein the instructions, when executed by the processor, further cause the processor to determine to deploy the serverless instance of the at least one custom machine image configured with the first initialized state for the application to the pool of servers to provide the application instead of the at least one of the plurality of custom machine images configured with the second initialized application state for the application based on a state of the application when providing the application.

15. At least one non-transitory computer-readable medium comprising a set of instructions that, in response to being executed by a processor circuit, cause the processor circuit to:
generate a plurality of custom machine images of one or more virtual servers, wherein at least one of the plurality of custom machine images is configured with a first initialized application state for an application and the at least one custom machine image configured with the first initialized state for the application includes a template for a root volume for use by an agent built using the at least one custom machine image configured with the first initialized state for the application;

monitor metric data of a pool of servers to detect a performance issue in providing the application, the pool of servers comprising a plurality of resources for the one or more virtual servers to support requests to access one or more applications;

detect the performance issue based on the monitoring of the metric data; and in response to detecting the performance issue:

determining whether a custom machine image has been previously generated for the application, deploying a serverless instance of the at least one custom machine image configured with the first initialized state for the application to the pool of servers to provide the application responsive to determining that the custom machine image has been previously generated for the application, the serverless instance generated via an instance generation service operative to translate the custom machine image into an object comprising initialized program code of the custom machine image that, when executed, is operative to provide a sequence of one or more functions to emulate an operation of a corresponding virtual server of the custom machine image to provide the application without requiring deployment of the corresponding virtual server, deploying a virtual server for the application responsive to determining that the custom machine image has not been previously generated for the application, and generating the custom machine image for the virtual server following provisioning and booting of the virtual server.

16. The at least one non-transitory computer-readable medium of claim 15, wherein each of the custom machine images is generated based on at least a portion of a plurality of resources provisioned and booted with initialization code.

17. The at least one non-transitory computer-readable medium of claim 16, wherein the set of instructions, in response to execution by the processor circuit, further cause the processor circuit to deploy the serverless instance as an initialized snapshot of a virtual server taken at a specific instance in time following initialization of the virtual server.

18. The at least one non-transitory computer-readable medium of claim 15, wherein the at least one custom machine image configured with the first initialized state for the application includes a block device mapping that specifies one or more volumes to attach to an agent built using the at least one custom machine image configured with the first initialized state for the application.

19. The at least one non-transitory computer-readable medium of claim 15, wherein at least one of the plurality of custom machine images is configured with a second initialized application state for the application, and the first and second initialized application states are different versions of the application.

20. The at least one non-transitory computer-readable medium of claim 19, wherein the set of instructions, in response to execution by the processor circuit, further cause the processor circuit to determine to deploy the serverless instance of the at least one custom machine image configured with the first initialized state for the application to the pool of servers to provide the application instead of the at least one of the plurality of custom machine images configured with the second initialized application state for the application based on a state of the application when providing the application.

* * * * *